No. 754,244. PATENTED MAR. 8, 1904.
G. W. SANFORD.
VEHICLE WHEEL.
APPLICATION FILED OCT. 9, 1903.
NO MODEL.

No. 754,244. Patented March 8, 1904.

UNITED STATES PATENT OFFICE.

GEORGE W. SANFORD, OF THOMASTON, CONNECTICUT, ASSIGNOR OF ONE-THIRD TO JAMES GRAY, OF THOMASTON, CONNECTICUT.

VEHICLE-WHEEL.

SPECIFICATION forming part of Letters Patent No. 754,244, dated March 8, 1904.

Application filed October 9, 1903. Serial No. 176,387. (No model.)

*To all whom it may concern:*

Be it known that I, GEORGE W. SANFORD, of Thomaston, in the county of Litchfield and State of Connecticut, have invented a new and useful Improvement in Vehicle-Wheels; and I do hereby declare the following, when taken in connection with the accompanying drawings and the figures of reference marked thereon, to be a full, clear, and exact description of the same, and which said drawings constitute part of this specification, and represent, in—

Figure 1:
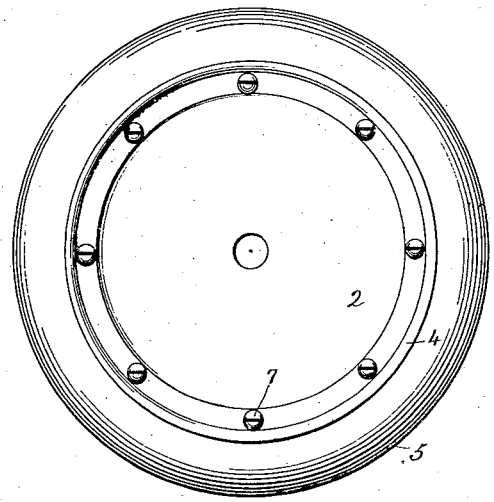
Figure 2:
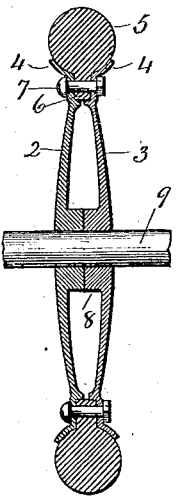

Figure 1, a side view of a wheel constructed in accordance with my invention; Fig. 2, a sectional view thereof.

This invention relates to an improvement in vehicle-wheels, and particularly to those which comprise two plates supporting the tire in contradistinction to wheels employing spokes, the object of the invention being a simple construction and arrangement of parts whereby a light yet sufficiently strong wheel is produced for use on automobiles or other heavy vehicles; and the invention consists in the details of construction and combinations of parts, as will be hereinafter described, and particularly recited in the claim.

In carrying out my invention I employ two circular plates 2 3, the edges 4 of which are flared outward slightly to form a groove or rim for the reception of a tire 5. As herein shown, the tire is substantially round, with an inwardly-extending flange or web 6, which extends inward between the plates and which is held in position by bolts 7, which pass through the plates and through the flange, the bolts serving not only to draw the plates together, but place them under tension. In the center of each plate is a hub 8, through which an axle 9 may pass. The adjacent faces of these hubs meet, and the length of the combined hubs is greater than the thickness of the flange or web 6, so that when the outer edges of the plates are drawn together the plates 2 and 3 will be bowed to give proper strength and rigidity to the wheel. If the plates are cast, the hubs will be formed integral therewith, and if struck up from sheet metal the hubs may be independently formed and connected with the plates in any desired manner. If desired, the outer edges of the plates may be of sufficient thickness to permit the holes therein to be threaded to receive the bolts, so that nuts will not be required; but preferably the plates will be comparatively thin and clamped together by bolts and nuts.

Having fully described my invention, what I claim as new, and desire to secure by Letters Patent, is—

A vehicle-wheel comprising two plates flaring outward at their outer edges and having centrally-arranged inwardly-projecting hubs arranged to meet, a tire having an inwardly-extending flange, and means for drawing the rims of the plates together and uniting them with the flange of the tire between them, whereby the plates are flexed, substantially as described.

In testimony whereof I have signed this specification in the presence of two subscribing witnesses.

GEORGE W. SANFORD.

Witnesses:
LUTHER J. POTTER,
HENRY E. STOUGHTON.